United States Patent
Advani et al.

(10) Patent No.: US 10,991,117 B2
(45) Date of Patent: Apr. 27, 2021

(54) PERFORMING A LOOP CLOSURE DETECTION

(71) Applicants: Siddharth K. Advani, Richardson, TX (US); Manish Goel, Plano, TX (US); Sourabh Ravindran, Dallas, TX (US)

(72) Inventors: Siddharth K. Advani, Richardson, TX (US); Manish Goel, Plano, TX (US); Sourabh Ravindran, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 28 days.

(21) Appl. No.: 16/231,554

(22) Filed: Dec. 23, 2018

(65) Prior Publication Data
US 2020/0202550 A1    Jun. 25, 2020

(51) Int. Cl.
*G06T 7/70* (2017.01)
*G02B 27/00* (2006.01)
*G02B 27/01* (2006.01)
*G06T 7/246* (2017.01)

(52) U.S. Cl.
CPC ............ *G06T 7/70* (2017.01); *G02B 27/0093* (2013.01); *G02B 27/0101* (2013.01); *G02B 27/0172* (2013.01); *G06T 7/246* (2017.01); *G02B 2027/0138* (2013.01); *G02B 2027/0178* (2013.01)

(58) Field of Classification Search
CPC ....... G06T 7/70; G06T 7/246; G02B 27/0093; G02B 27/0101; G02B 27/0172; G02B 2027/0138; G02B 2027/0178
See application file for complete search history.

(56) References Cited

U.S. PATENT DOCUMENTS

| 9,288,633 | B2 | 3/2016 | Yang |
| 9,541,383 | B2* | 1/2017 | Abovitz ................. A61B 34/10 |
| 9,739,891 | B2 | 8/2017 | Kennedy |
| 2012/0306847 | A1 | 12/2012 | Lim |
| 2015/0301592 | A1* | 10/2015 | Miller .................... G06T 13/40 |
| | | | 345/156 |
| 2016/0302639 | A1 | 10/2016 | Lindhe |
| 2016/0330374 | A1* | 11/2016 | Ilic .................... H04N 5/23251 |
| 2017/0178331 | A1 | 6/2017 | Narikawa |
| 2017/0205903 | A1 | 7/2017 | Miller |
| 2017/0337749 | A1 | 11/2017 | Esha |
| 2018/0089832 | A1 | 3/2018 | Liu |
| 2018/0113506 | A1 | 4/2018 | Hall |

FOREIGN PATENT DOCUMENTS

| JP | 3695930 | 8/2005 |
| KR | 20120046614 | 5/2012 |
| KR | 1177271 | 8/2012 |
| KR | 20170061373 | 6/2017 |
| KR | 20170099137 | 6/2017 |
| WO | 2015192117 | 12/2015 |
| WO | 2018134686 | 7/2018 |

OTHER PUBLICATIONS

Written Opinion and Search Report of PCT/KR2019/004454, dated Sep. 20, 2019.

* cited by examiner

*Primary Examiner* — Yon J Couso
(74) *Attorney, Agent, or Firm* — John J. King (57) ABSTRACT

A method of performing loop closure detection is described. The method comprises detecting a movement of a device having a camera; and adaptively disabling or enabling, using a processor of the device, a loop closure detection of the device based upon the detected movement of the device.

20 Claims, 7 Drawing Sheets

PERFORMING A LOOP CLOSURE DETECTION

FIELD OF THE INVENTION

An embodiment of the invention relates generally to devices that capture images, and in particular, to systems and methods of performing loop closure detection.

BACKGROUND OF THE INVENTION

Object detection using images captured by an electronic device can have many practical applications. However, object detection can require significant computational resources and may take considerable time. Smart eyewear, such as smart glasses and Head-Mounted-Display (HMD) wearable devices have many emerging applications. Useful features to enable such applications for smart eyewear or other tracking devices having cameras (e.g. robotic tracking devices) include object detection, recognition, and tracking and showing the result on a display. Object detection is also important for Simultaneous Localization and Mapping (SLAM).

Loop Closure Detection (LCD) is an important component in SLAM applications. While a SLAM engine is running on an electronic device, LCD identifies previously visited places so that global bundle adjustment (BA) can be invoked at such instances. Global BA may be used to optimize and realign the camera pose information (of keyframes) and 3D map point positions, which may have accumulated a certain amount of drift during navigation. In conventional implementations of SLAM, the LCD is run at a fixed periodic rate, thus causing unnecessary false alarms in situations where the user is not moving at all or when a user is not interacting with the Augmented Reality (AR) application. Unnecessarily running LCD also causes an increase in power consumption.

Accordingly, there is a need for improved LCD operation to improve the efficiency of smart eyewear or other devices having cameras for tracking objects.

SUMMARY OF THE INVENTION

A method of performing loop closure detection is described. The method comprises detecting a movement of a device having a camera; and adaptively disabling or enabling, using a processor of the device, a loop closure detection of the device based upon the detected movement of the device.

A system for monitoring a movement of a device is also described. The system comprises a processor coupled to receive data from a sensor, wherein the processor: detects a movement of a device having a camera; and adaptively disables or enables a loop closure detection of the device based upon the detected movement of the device.

A non-transitory computer-readable storage medium having data stored therein representing instructions executable by a processor performs a method comprising detecting a movement of a device having a camera; and adaptively disabling or enabling, using a processor of the device, a loop closure detection of the device based upon the detected movement of the device.

DETAILED DESCRIPTION OF THE DRAWINGS

LCD determines when a current scene has been seen previously during the course of a device having a camera traversing a particular area. If the scene has been seen previously, then a loop is said to have been detected and certain processing may be performed, such as global bundle adjustment to refine pose estimates based upon what is currently detected. The methods and systems enable adaptive LCD, which may be event-driven LCD for example, and solve a problem of when to trigger LCD based on user motion, user interactions with the AR application, and a specific AR application being implemented for example. Some implementations include monitoring user motion while using an AR application to decide when to enable/disable LCD, monitoring user interactions while using an AR application to decide when to enable/disable LCD, and monitoring the use of AR application-specific decisions to decides when to enable/disable LCD.

While the specification includes claims defining the features of one or more implementations of the invention that are regarded as novel, it is believed that the circuits and methods will be better understood from a consideration of the description in conjunction with the drawings. While various circuits and methods are disclosed, it is to be understood that the circuits and methods are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the circuits and methods.

Figure 1:
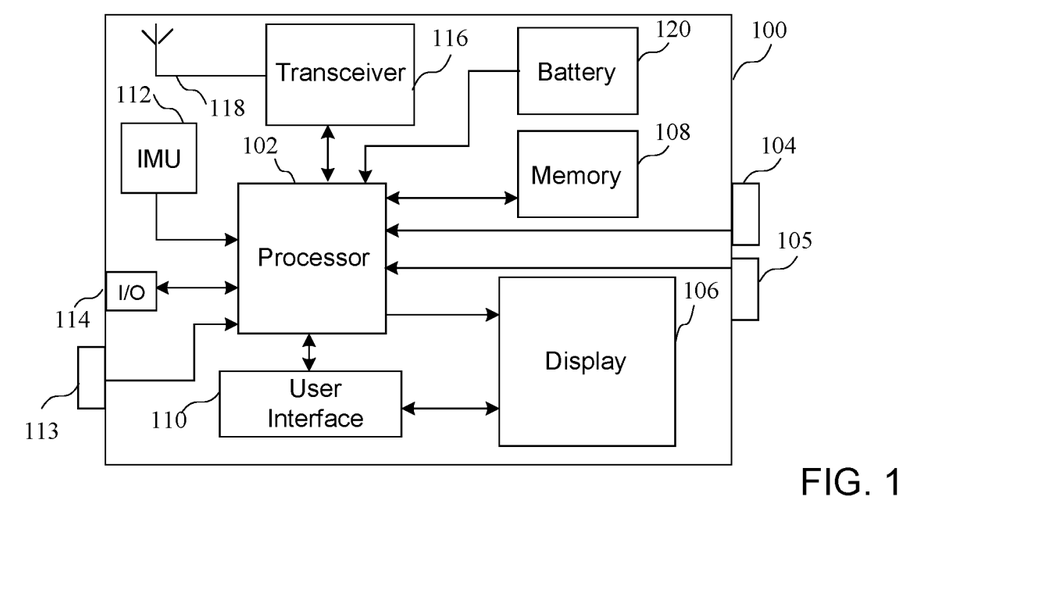
FIG. 1 is an exemplary block diagram of an electronic device having a camera.

Turning first to FIG. 1, a block diagram of an electronic device having multiple cameras is shown. The exemplary electronic device 100 that may be any type of device having one or more cameras. The electronic device 100 may comprise a processor 102 coupled to a plurality of cameras 104 and 105. While cameras 104 and 105 are shown, it should be understood that the cameras comprise image recording devices, such as image sensors, and that the cameras may be independent of each other or may share circuitry. The cameras may a part of an HMD, where one camera may be used for providing a view of a scene and the other may be used for performing eye tracking (i.e. the movement and viewing direction) of the eyes of a user of the HMD. The mobile device 100 could be any type of device, such as a wearable device or other robotic device, for performing location tracking including SLAM. The processor 102 is an integrated electronic circuit such as, for example, an ARM processor, an X86 processor, a MIPS processor, a graphics processing unit (GPU), a general purpose GPU, or any other processor configured to execute instructions stored in a memory. The processor 102 could be implemented in one or more processing devices, where the processors may be different. For example, the electronic device could include a central processing unit (CPU) as well as a GPU for example.

The processor 102 may be coupled to a display 106 for displaying information to a user. The processor 102 may also be coupled to a memory 108 that allows storing information related to data or information associated with achieving a goal. The memory 108 could be implemented as a part of the processor 102, or could be implemented in addition to any cache memory of the processor, as is well known. The memory 108 could include any type of memory, such as a solid state drive (SSD), Flash memory, Read Only Memory (ROM) or any other memory element that provides long term memory, where the memory could be any type of internal memory of the electronic device or external memory accessible by the electronic device.

A user interface 110 is also provided to enable a user to both input data and receive data. Some activity tracking may require user's manual input. The user interface could include a touch screen user interface commonly used on a portable communication device, and other input/output (I/O) elements, such as a speaker and a microphone. The user interface could also comprise devices for inputting or outputting data that could be attached to the mobile device by way of an electrical connector, or by way of a wireless connection, such as a Bluetooth or a Near Field Communication (NFC) connection.

The processor 102 may also be coupled to other elements that receive input data or provide data, including various sensors 111, an inertial measurement unit (IMU) 112 and a Global Positioning System (GPS) device 113 for activity tracking. For example, an inertial measurement unit (IMU) 112 can provide various information related to the motion or orientation of the device, while GPS 113 provides location information associated with the device. The sensors, which may be a part of or coupled to a mobile device, may include by way of example a light intensity (e.g. ambient light or UV light) sensor, a proximity sensor, an environmental temperature sensor, a humidity sensor, a heart rate detection sensor, a galvanic skin response sensor, a skin temperature sensor, a barometer, a speedometer, an altimeter, a magnetometer, a hall sensor, a gyroscope, WiFi transceiver, or any other sensor that may provide information to the mobile device. The processor 102 may receive input data by way of an input/output (I/O) port 114 or a transceiver 116 coupled to an antenna 118.

Figure 2:
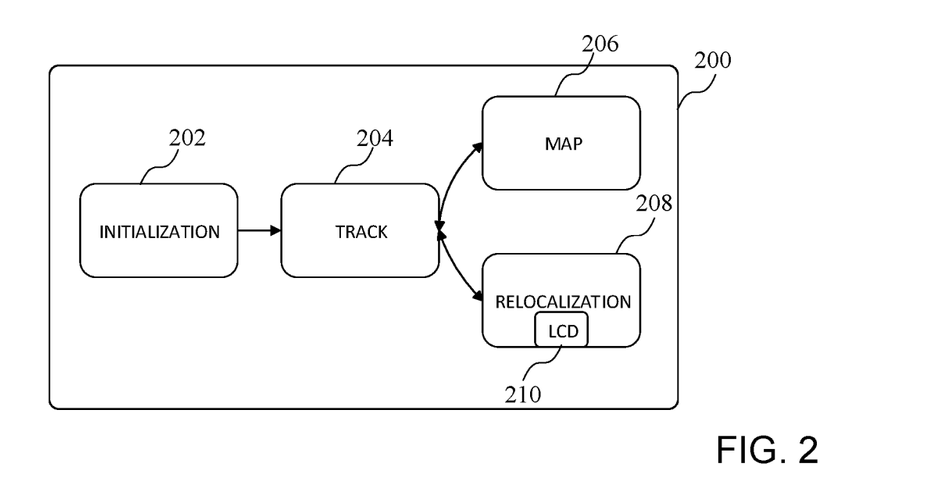
FIG. 2 is an exemplary diagram showing blocks associated with tracking objects with a camera and loop closure detection.

Turning now to FIG. 2, an exemplary diagram shows blocks associated with a system 200 for capturing images and implementing loop closure detection associated with a tracking operation. The system 200 comprises an initialization block 202, an output of which coupled to a tracking block 204. The initialization block initializes the device to perform a function, such as a Mapping function by a mapping block 206, by extracting features which are tracked during a tracking phase for example. After a certain number of frames are written to a memory and it is possible to track the extracted features, the tracking, such as a SLAM tracking process, can be performed by the tracking block 204.

As a part of a mapping function, a relocalization, including LCD can be performed. Relocalization is generally performed when drift of the device performing the tracking exceeds a certain value, or features are lost, such as when the lights go off or there is an occlusion. LCD enables the identification of object or locations by a camera as the camera traverses a path, and may be used as a part of a relocalization by a relocalization block 208. A LCD block 210 enables an adaptive loop closure detection, where the loop closure detection may be enabled or disabled according to certain criteria associated with a user of a specific AR application as will be described in more detail below. LCD determines when a current scene has been seen previously during the course of traversing that particular area. If the scene has been seen previously, then a loop is said to have been detected and certain processing may be performed, such a global bundle adjustment to refine pose estimates. According to some implementations, adaptively disabling or enabling a loop closure detection of a device may comprises disabling the loop closure detection based upon a modality of the device. For example, the modality may be a specific AR application, where the loop closure detection may be based upon input from an application layer of the AR application, such as an environmental history and/or location setting associated with the operation of the AR application.

Figure 3:
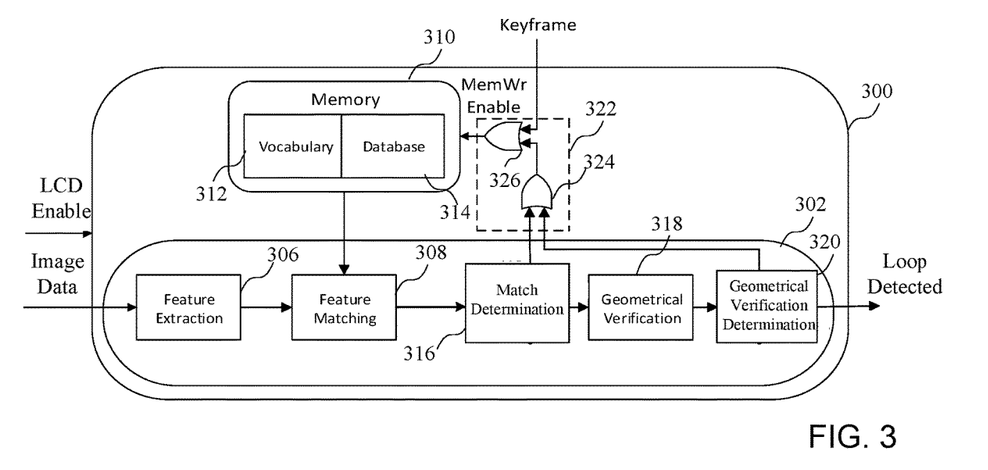
FIG. 3 is an exemplary diagram of a circuit for implementing loop closure detection.

Turning now to FIG. 3, an exemplary diagram of a circuit 300 for implementing loop closure detection, which may be implemented in the loop closure detection block 208, is shown. The circuit 300 receives an LCD Enable signal, which may be in response to a particular application run on eyewear requiring an LCD operation, to adaptively enable an LCD operation. Image data from a camera of a device, such has eyewear or other device for tracking images, is provided to a processing circuit 302. The processing circuit 302 comprises a feature extraction block 306, where extracted features are matched in a feature matching block 308. According to one implementation, the extracted features are compared to values generated by a memory 310 having a vocabulary 312 and a database 314. As will be described in more detail below, the memory 310 may include pre-stored images having certain features, or images having features that are added as different paths are traversed by the devices. A match determination block 316 will generate an output signal based upon a result of a feature matching process. As will be described in more detail below, each feature stored in memory will be compared to features of the image data to determine a match.

If the features compared in the feature matching block 308 are determined to match by the match determination block 316, a match indication is provided to a geometrical verification block 318, which performs a geometrical verification of the features that are compared. More particularly, while the match comparison may be made with little spatial context, another verification can be performed to determine whether an object matches in another view, such as from a different angle. A loop detected signal is generated if it is determined that there is both a feature match and a geometrical verification.

However, if either a feature match or the geometrical verification fails, as indicated by outputs generated by the match determination block 316 and the geometrical verification determination block 320 respectively, a control circuit 322 enables writing to the memory to enable storing new features. According to one implementation, data stored in the memory is sequentially accessed and matched with image data to determine whether the camera generating the image data is in a loop (i.e. identifying previously viewed features), in which case LCD could be implemented. According to another implementation, the images (or portions of images comprising features) in the memory may be compared to input data images. For example, let there be N images where each image is encoded as M feature vectors in the vocabulary. When an input image frame is captured by the camera, image features are extracted from it (typically M) and are matched with the M features of each of the N images. Thus, for each of the N images, there will be N memory read enable signals that are generated to produce M feature vectors per image. These are then compared to the M feature vectors of the input image in a feature matching stage.

More particularly, outputs (e.g. a logical 1) of the match determination block 316 and the geometric verification determination block 320 indicate that either there is no match during feature point matching, or there is no geometrical verification with a matched feature point, are provided to an OR gate 324. An output of the OR gate 324 (e.g. a logical 1) may be generated to indicate that a write should be performed, where a memory write enable (MemWrEnable) and a keyframe (or a relevant portion of the keyframe comprising features of the keyframe) are provided to the memory. According to one implementation, the memory may comprise a vocabulary 312, which may be an off-line portion that comprises predetermined features, and a database 314, which may compare new features of the image data that are added to the memory. It should be noted that FIG. 3 provides one example of a circuit for performing LCD, but that the systems and methods of performing LCD could be implemented with any type of circuit for performing LCD.

Figure 4:
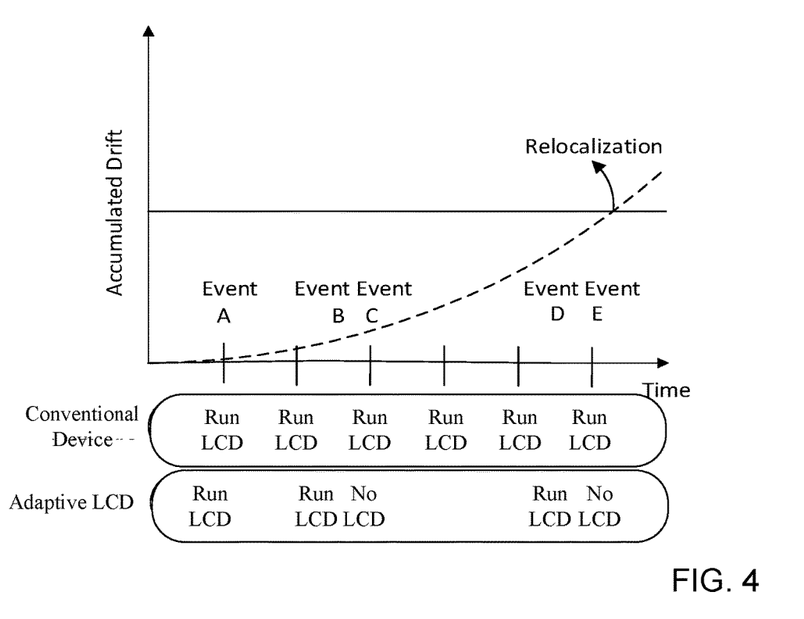
FIG. 4 is a timing diagram showing the operation of adaptive loop closure detection compared to a conventional loop closure detection circuit.

Turning now to FIG. 4, a timing diagram shows the operation of adaptive loop closure detection compared to a conventional loop closure detection circuit. As shown in FIG. 4, a conventional device that periodically runs LCD will not only run LCD when no event has occurred, but may also miss an event. For example, when LCD is run at the periodic times as shown in FIG. 4, Event B and Event D would be missed, while LCD would run unnecessarily between Event A and Event B, and twice between Event C and Event D. That is, LCD in conventional devices runs periodically, and is agnostic of user events, which may not be periodic. As a result, events are missed and unnecessary power is required. In contrast, adaptive LCD, which may be implemented using the circuit of FIG. 3 by adaptively controlling the LCD Enable signal for example, adaptively runs LCD based upon the detection of certain events. For example, LCD may be run for Event A and Event B and Event D based upon the detection of certain events, but may not be run for Event C and Event E. That is, although the Event C and Event E were detected, LCD was intentionally not run for those events. Drift is shown by the dashed line, where a relocalization process occurs after the accumulated drift reaches a certain point.

Accordingly, as shown in FIG. 4, adaptive LCD will not perform LCD when no event is detected, and may not perform LCD even when an event is detected. For example, depending upon the type of motion or other actively of a user or an application that is running, such as a certain type of AR application, LCD may or may not be performed in response to the detection of a certain event, as will be described in more detail below. Additional details related to adaptive LCD are provided in reference to FIG. 5.

Figure 5:
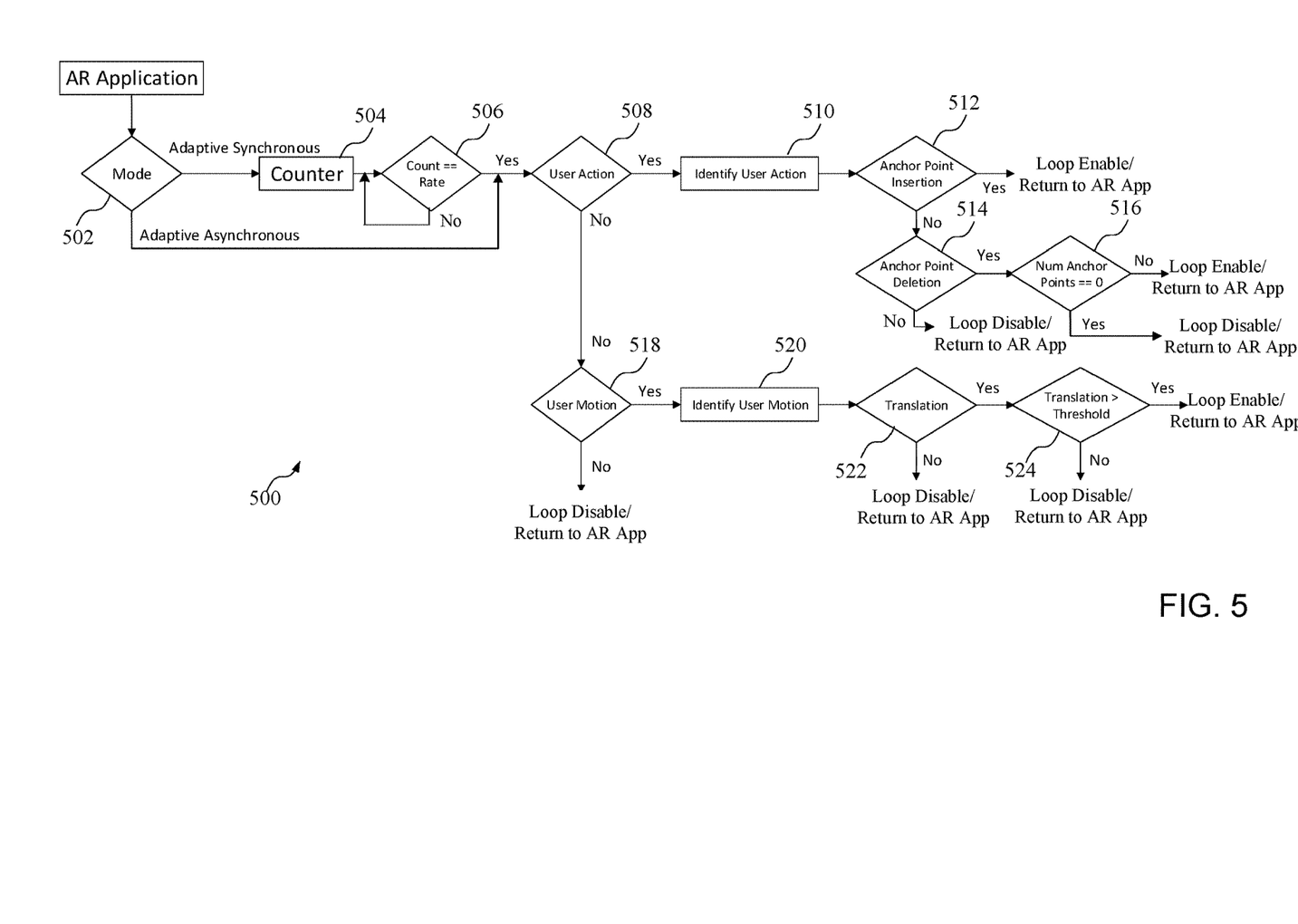
FIG. 5 is a flow chart showing an example of adaptive loop closure detection.

Turning now to FIG. 5, a flow chart 500 shows an adaptive operation of loop closure detection. An AR application can set the mode to implement asynchronous or synchronous LCD. During a synchronous mode, the device will adaptively decide whether to run LCD periodically, such as based upon a predetermined count of a clock. During an asynchronous mode, LCD can be performed whenever an event that satisfies some predetermined criteria is detected.

A user motion filter may be used to detect whether the user is moving while using the AR application. If valid user motion is detected, the loop enable signal is turned on and LCD is executed. A user action filter may also be used to detect whether the user has created anchor points in the AR scene. The loop enable signal may be turned on based upon a determination of anchor points in the scene. According to one implementation, if all anchor points are deleted, then the loop enable signal is turned off. That is, since there are no augmented objects to anchor to the real scene, it is not necessary to perform LCD.

Referring specifically to the flow chart of FIG. 5, after an AR application is run, the mode of the AR application being used is determined at a block 502. If an Adaptive Synchronous mode is being used, a counter may be run at a block 504 to determine when to run LCD, and a count rate is determined at a block 506. If the count equals the count rate, it is then determined whether there has been a user action at a block 508, in which case user action is identified at a block 510 (where user action may be associated with creating or deleting an anchor point). If an anchor point has been inserted at a block 512, a loop enable is asserted (i.e. loop detection is performed), and the process returns to the start of the AR application monitoring at block 502.

If no anchor point is inserted, it is determined whether there is an anchor point deletion at a block 514. If not, the loop disable is asserted and the process returns to the start at block 502. If there is an anchor point deletion, it is determined whether the number of anchor points is equal to zero at block 516. If not, the loop enable is asserted, and the process returns to the start at block 502. If so, the loop disable is asserted, and the process returns to the start at block 502.

If there has been no user action at a block 508, user motion is also checked at a block 518, where user motion can be used to determine whether a user is traversing a path. If it is determined that there is no user motion, the loop disable is asserted, and the process returns to the start at the block 502. If there is user motion, the user motion is identified at a block 520, and it is determined whether there is a translation at a block 522. If not, the loop disable is asserted, and the process returns to the start at block 502. If a translation is detected at the block 522, it is determined whether the translation exceeds a threshold at a block 524. If not, the loop disable is asserted and the process returns to the start at the block 502. If so, the loop enable is asserted, and the process returns to the start at the block 502. Specific examples of user action and user motion will be described in more detail below in reference to FIG. 6. While the flow chart of FIG. 5 discloses an AR application, it should be understood that the methods described in FIG. 5 could be used with any type of application using a camera to provide loop detection.

Figure 6:
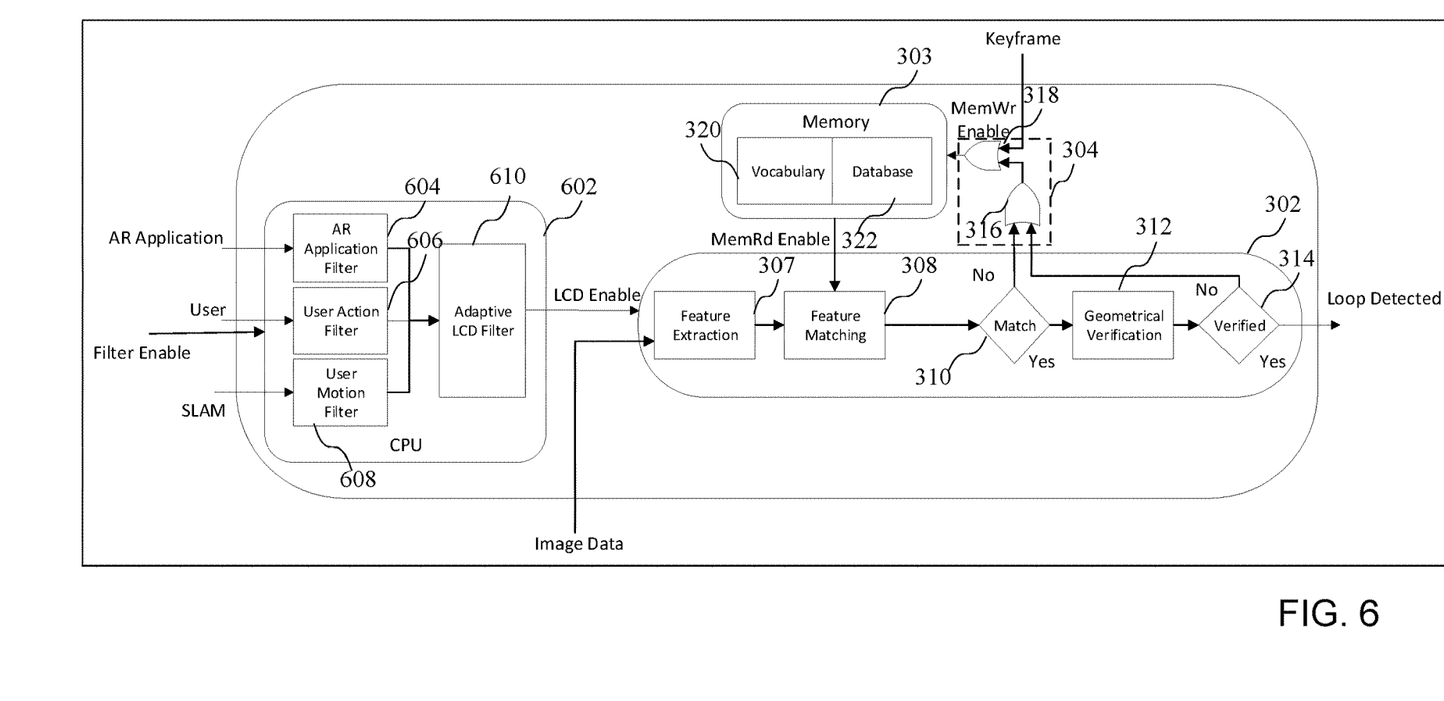
FIG. 6 is an exemplary diagram of a circuit comprising a pre-filter for implementing adaptive loop closure detection.

Turning now to FIG. 6, an exemplary diagram of a circuit for implementing loop closure detection, such as loop closure detection described above in FIG. 5, comprising a pre-filter 602 is shown. The pre-filter 602 is adapted to generate a LCD Enable signal to enable or disable a loop detection circuit, such as the loop detection circuit of FIG. 3. The pre-filter 602 receives various inputs to generate an LCD Enable signal that enables or disables the LCD operation to function as an adaptive LCD. More particularly, the pre-filter 602 receives a Filter Enable signal that enables the pre-filter to operate, and various inputs that are processed to determine whether the LCD Enable signal enables or disables the LCD operation, and therefore makes the LCD operation adaptive.

An application filter block 604, shown here by way of example as an AR application filter, receives an input from an AR application. An output of the AR application filter block is provided to an adaptive LCD filter 610 that generates an LCD Enable signal. That is, the requirements for enabling/disabling LCD may differ based on the AR-application. For an office AR application for example, it may be necessary to enable loop detection, but for a gym AR application it may not be desirable to enable loop detection. The adaptive LCD allows the application layer of the AR application to make a determination of whether to enable or disable LCD, and also whether event-driven LCD should be run synchronously or asynchronously.

A user action filter block 606 receives an input from a user, such as a head motion of the user to identify an object in a room. An output of the user action filter block is provided to an adaptive LCD filter 610 that generates an LCD Enable signal. By way of example, an AR-application may be used for learning new cooking recipes. If a user opens up the recipe app in front of the kitchen stove and turns to the left, an anchor point in the form of an augmented recipe book may be created. Adaptive LCD may detect loops after the user has created the anchor point even though the user may be stationary. That is, a loop is detected in response to a user action, even if there is no user motion.

A user motion filter block 608, which may be for an AR application for example, may receive an input from an AR application. An output of the user motion filter block is provided to an adaptive LCD filter 610 that generates an LCD Enable signal. By way of example, an AR-application may track a user walking through a grocery shop and stopping at a particular aisle to check some products. Because the user is stationary, LCD need not run since there are no potential loops to detect. In contrast, in the case of a user running an AR application for recipes, LCD may run even when the user is stationary based upon the user's head motion. The LCD Enable signal generated by the pre-filter 602 is used to enable LCD, which could be implemented using the circuit of FIG. 3 as described above, or some other circuit.

It should also be noted that, if enabled and a loop is detected, then global bundle adjustment may be triggered even if LCD not performed. That is, in some cases, performing a global bundle adjustment may be performed based upon the criteria for determining whether to enable LCD, as will be described in more detail below in reference to FIG. 8.

Figure 7:
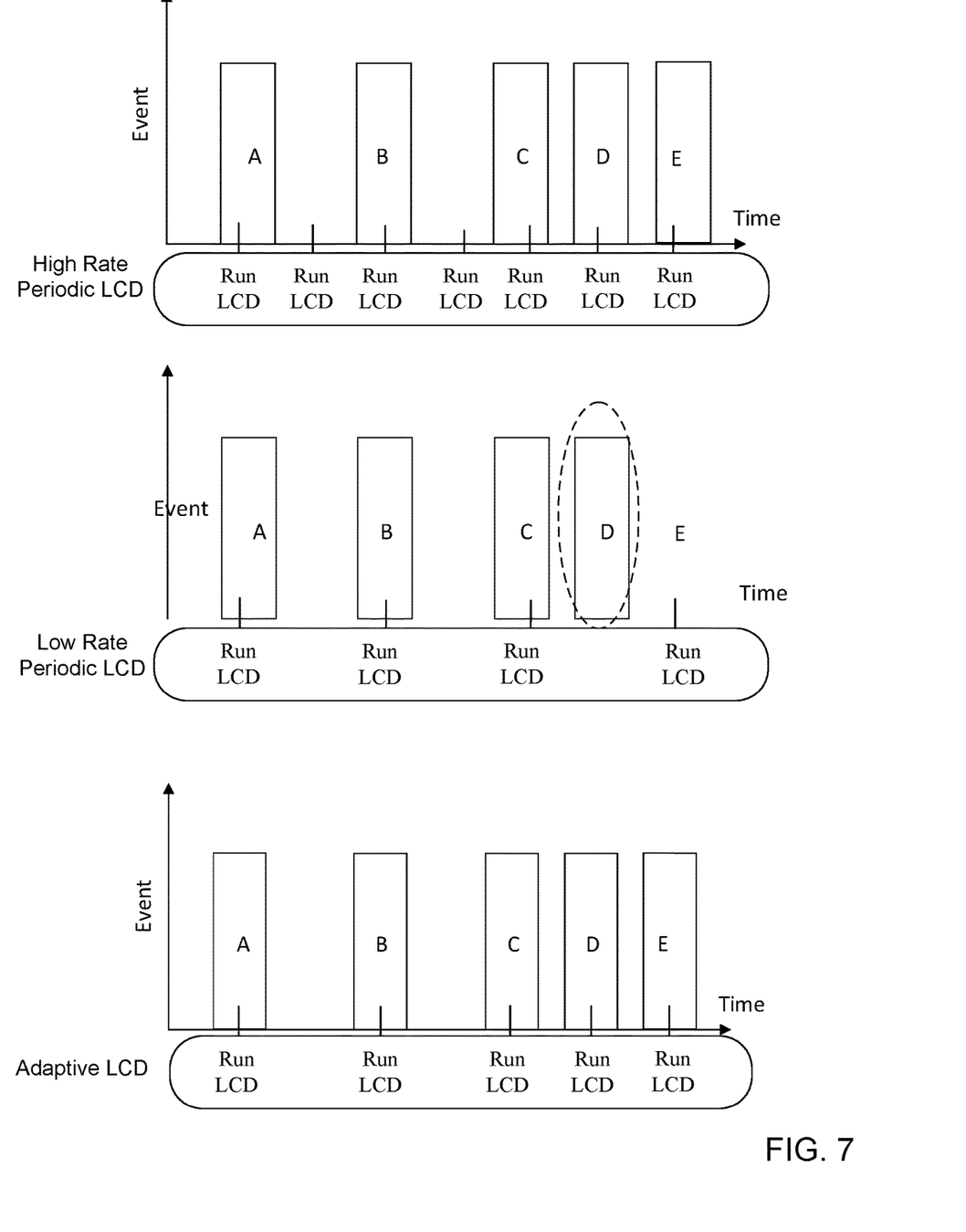
FIG. 7 is another timing diagram showing the operation of adaptive loop closure detection compared to conventional loop closure detection.

Turning now to FIG. 7, another timing diagram shows the operation of adaptive loop closure detection. In a high rate periodic LCD of a conventional device, all of the events are captured, but the LCD is run at times when no event has occurred (i.e. between Events A and B and between Events B and C), and therefore leads to a power loss. In contrast, at a low rate periodic LCD of another conventional device, the LCD runs less frequently, leading to reduced power, but Event D is missed. However, as shown using adaptive LCD, the LCD is only run when an event occurs, and therefore uses only the power as necessary without missing events. The adaptive LCD can determine to detect Events A-E based upon determinations of the pre-filter 602 as described above, or other determinations. For example, as described above in reference to FIG. 4, LCD may not be run even when an event is detected.

Figure 8:
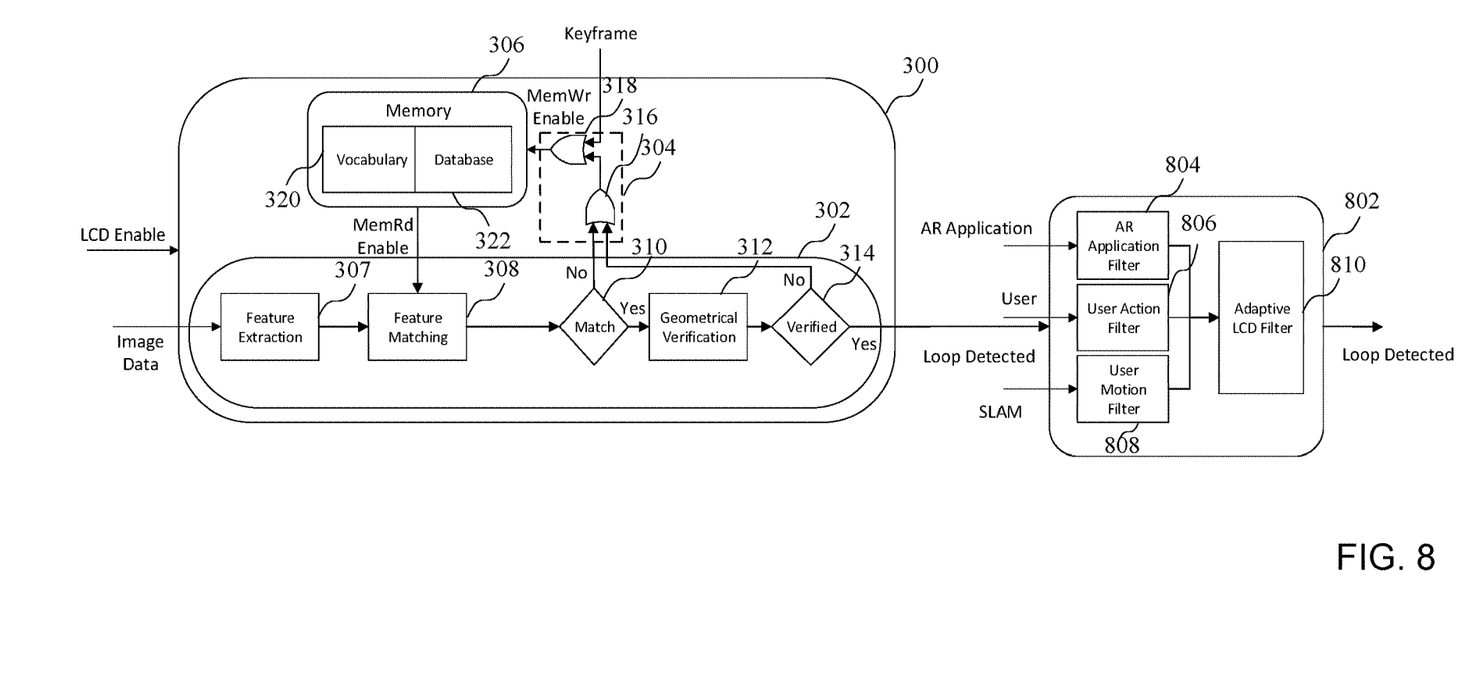
FIG. 8 is an exemplary diagram of a circuit for implementing adaptive loop closure detection and comprising a post-filter.

Turning now to FIG. 8, an exemplary diagram of a circuit for implementing loop closure detection comprising a post-filter is shown. In addition to a loop detection signal generated by the circuit 300 as described above in reference to FIG. 3, a post-filter 802, which may be similar to the pre-filter 602 of FIG. 6, receives various inputs to determine whether to perform other functions during a tracking operation, such as SLAM. More particularly, the post-filter 802 receives a loop detection signal that enables the post-filter, and various inputs that are processed to determine whether to enable an operation of a function of the circuit performing tracking, such as for example performing global BA.

An application filter block 804 of the post-filter 802, which may be for an AR application for example, receives an input from an AR application. An output of the AR application filter block 804 is provided to an adaptive LCD post-filter 810 that generates a Loop Detected signal that may be used for determining whether to perform a certain function, such as global BA. The requirements for enabling/disabling LCD may differ based on the AR-application. As set forth above with respect to FIG. 6, for an office AR application, it may be necessary to enable loop detection, while for a gym AR application it may not be desirable to enable loop detection. The adaptive LCD allows the application layer of the AR application to make this determination. A user action filter block 806 receives an input from a user, where an output of the user action filter block is provided to an adaptive LCD filter 810 that generates the loop detected signal, as described above in reference to FIG. 6. Finally, a user motion filter block 808, which may be for an AR application for example, receives an input from an AR application as described above in reference to FIG. 6, and can also be used to generate the Loop Detection Signal.

Therefore, a Loop Detection circuit generated by a loop detection circuit, such as circuit 300, can be used generate a function Enable Signal, which may be used for a function such as global BA. A global BA optimizer may or may not be part of the loop closure detection depending on the SLAM engine. If loop is detected by loop closure detection, then global bundle adjustment can be enabled/disabled based on user events, such as by the post-filter 802. The implementation of FIG. 8 allows for the enabling/disabling of the LCD as well as control of global BA blocks within SLAM. While the pre-filter 602 will be in a static 'always on' state, the post-filter 802 will generally be dynamically 'woken up' when a loop is detected.

Figure 9:
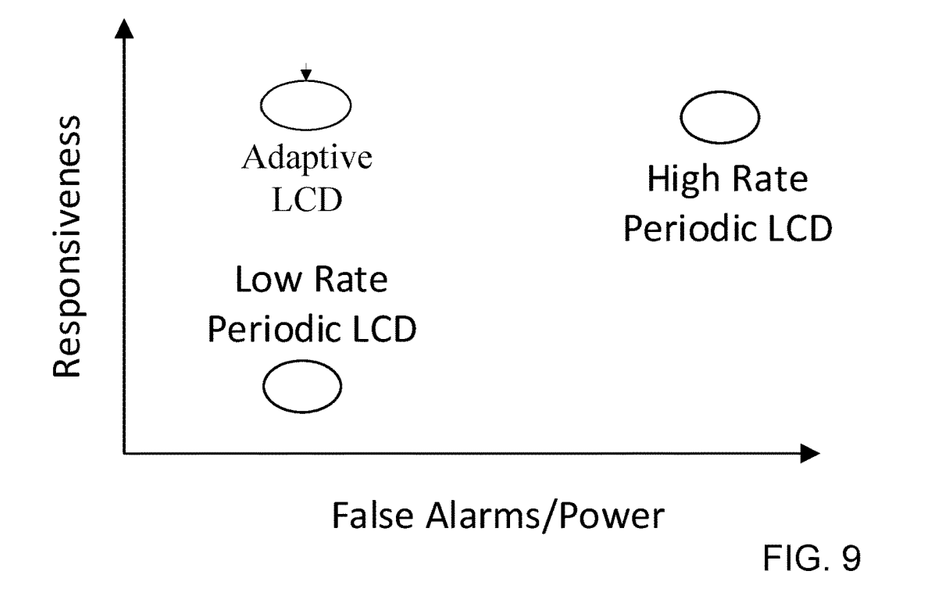
FIG. 9 is a chart showing a comparison of conventional high rate and low rate periodic loop closure detection with adaptive loop closure detection.

Turning now to FIG. 9, a chart shows a comparison of conventional loop closure detection with adaptive loop closure detection. As shown in FIG. 9, adaptive LCD according to the present disclosure is not only more responsive than a low rate periodic LCD, but also requires less power than a high rate periodic LCD. Use case analysis also establishes that adaptive LCD reduces power consumption and improves operation. Considering an AR-application where user is walking through a grocery shop and spends 10 minutes in the shop, the user may be stationary for an estimated 2 minutes while stopping at different aisles. Assuming that a conventional LCD solution runs at a fixed rate of 3 Hz (3 times per second) and adaptive LCD runs at 3 Hz if user is moving and at the minimum necessary rate (i.e. to trigger relocalization) of 1 Hz if user is stationary, the number of false loops detected can be reduced significantly based on user motion, user actions and the AR-application. Further, the power consumption can be reduced significantly because the loop closure detection may be run adaptively rather than at a fixed periodic rate.

Table 1 shows the performance breakdown of a SLAM engine (ORB-SLAM2) when run on Samsung® Galaxy S7 phone using a predetermined dataset. As shown in the table, the last row gives the frames processed by, cumulative time consumed by and the per frame processing time of loop closure detection (LC). The ratio of Key frames to Total frames is 375/2965=0.13. All these 375 Key frames are used in the loop closure (LC) thread. When SLAM runs for approximately 600 seconds of which approximately 10 seconds are used by the loop closure thread, then 10/600=0.0167 is the fraction of time taken up by LC. The Total Power consumed by SLAM=4.5 W−4.3 W=200 mW. Therefore, the information of Table 1 is used to calculate power savings, where the Key frame to Total frame ratio is 0.1 and where user motion is considered to adaptively change rate of LC. If it is assumed that conventional LCD is run at 3 Hz (e.g. 3 times per second) and adaptive LCD is run at 3 Hz if the user is moving but is run at the minimum necessary rate (to trigger relocalization) of 1 Hz if the user is stationary, false alarms are reduced from 360 using conventional LCD to 120 using adaptive LCD, and the number of times LCD is run is reduced from 1800 using conventional LCD to 1560 using adaptive LCD. Compute power may also be reduced by 43 microWatts (ρW) and memory power requirement by 30 μW.

TABLE 1

| Thread | Function | Frames Processed | Cumulative Time (sec) | Time per Frame (ms) |
|---|---|---|---|---|
| | ORB | 2965 | 207.86 | 70.1045531197 |
| | Init | 203 | 22.2086 | 109.401970443 |
| Track | InitPoseEstimation | 2756 | 29.2294 | 10.6057329463 |
| | TrackLocalMap | 2756 | 113.096 | 41.0362844702 |
| | KFInsert | 377 | 25.0047 | 66.325464191 |
| | Map Pt Culling | 377 | 0.218287 | 0.57901061008 |
| Map | Map Pt Creation | 377 | 40.1063 | 106.382758621 |
| | Local BA | 376 | 276.282 | 734.792553191 |
| | KFCulling | 376 | 16.7424 | 44.5276595745 |
| LC | All | 375 | 9.72852 | 25.94272 |

It should also be noted that adaptive LCD can be implemented in an image-to-image matching framework of loop closure detection, as well as other frameworks such as map-to-map matching and image-to-map matching because a local map will always be available even if user is stationary or anchor points are deleted.

Figure 10:
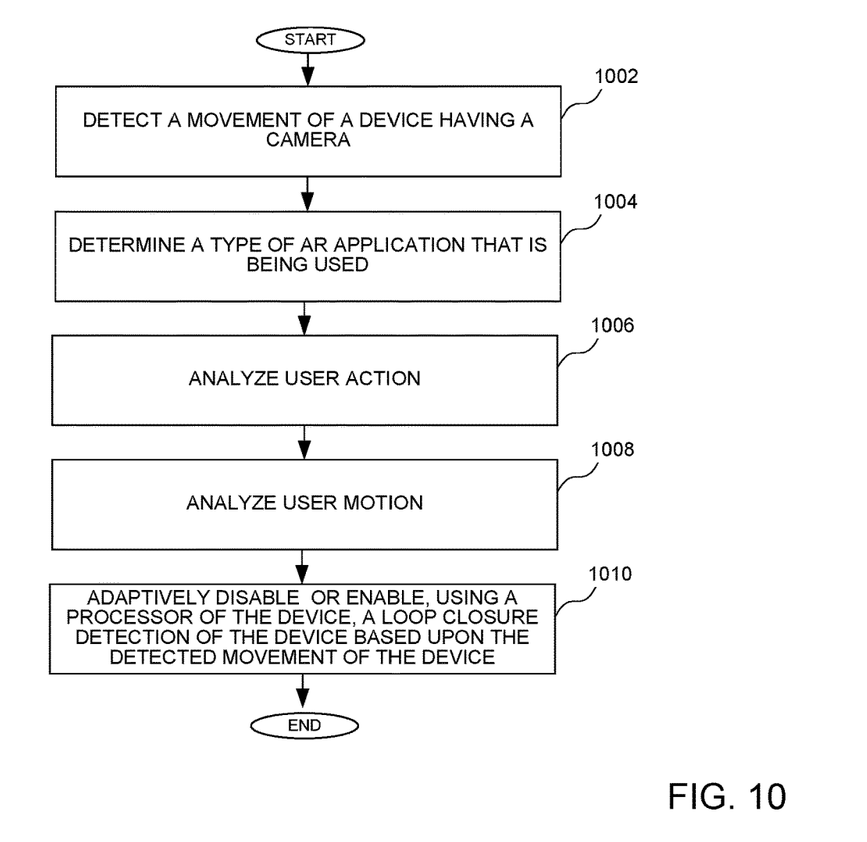
FIG. 10 is flow chart showing a method of implementing adaptive loop closure detection.

Turning now to FIG. 10, a flow chart shows a method of implementing adaptive loop closure detection. More particularly, the movement of a device having a camera is detected at a block 1002. The device could be, for example, a device for implementing SLAM. A type of AR application that is being used is determined at a block 1004. As described above, certain actions or motions of a user may affect whether LCD is disabled. User actions are analyzed at a block 1006 and user motions are analyzed at a block 1008. For example, user actions associated with a movement of the head to identify an action associated with a particular activity. User motion could also be analyzed to determine a path or other change of location of the user. LCD could be adaptively disabled or enabled using a processor of a device based upon the type of AR application, user action or user motion at a block 1010.

The various elements of the methods of FIG. 10 may be implemented using the circuits of FIGS. 1-8 as described, or using some other suitable circuits. While specific elements of the method are described, it should be understood that additional elements of the method, or additional details related to the elements, could be implemented according to the disclosure of FIGS. 1-8.

It can therefore be appreciated that new circuits for and methods of implementing an adaptive LCD have been described. It will be appreciated by those skilled in the art that numerous alternatives and equivalents will be seen to exist that incorporate the disclosed invention. As a result, the invention is not to be limited by the foregoing implementations, but only by the following claims.

We claim:

1. A method of performing loop closure detection, the method comprising:
   detecting, using a processor of a device, a movement of the device having a camera;
   analyzing the detected movement of the device;
   determining whether the detected movement of the device is associated with an action of a user of the device or a motion of the user of the device; and
   adaptively disabling or enabling, using the processor of the device, a loop closure detection of the device based upon whether the detected movement of the device is the action of the user or the motion of the user.

2. The method of claim 1 wherein detecting a movement of the device comprises detecting whether a translation of the user using the device exceeds a threshold.

3. The method of claim 1 wherein adaptively disabling or enabling a loop closure detection of the device comprises enabling the loop closure detection of the device in response to an insertion of an anchor point based upon an interaction of the user with a scene.

4. The method of claim 1 wherein detecting a movement of a device having a camera comprises tracking a motion of the user of a head mounted device.

5. The method of claim 1 wherein adaptively disabling or enabling a loop closure detection of the device comprises disabling the loop closure detection of a head mounted device based upon at least one of a translation or rotation of the head mounted device.

6. The method of claim 1 wherein adaptively disabling or enabling a loop closure detection of the device comprises disabling the loop closure detection based upon a modality of the device.

7. The method of claim 1 wherein adaptively disabling or enabling a loop closure detection of the device comprises enabling a loop closure detection in response to a deletion of an anchor point.

8. The method of claim 7 wherein adaptively disabling or enabling a loop closure detection of the device comprises disabling a loop closure detection if all anchor points are deleted.

9. The method of claim 1 further comprising implementing a pre-filter, wherein adaptively disabling or enabling a loop closure detection of the device is based upon an AR application.

10. The method of claim 1 further comprising implementing a post-filter, wherein a global bundle adjustment may be performed when a loop is detected.

11. A system for monitoring a movement of a device, the system comprising:
   a processor coupled to receive data from a sensor, wherein the processor:
      detects a movement of a device having a camera;
      analyzes the detected movement of the device;
      determines whether the detected movement of the device is associated with an action of a user of the device or a motion of the user of the device; and
      adaptively disables or enables a loop closure detection of the device based upon whether the detected movement of the device is the action of the user or the motion of the user.

12. The system of claim 11 wherein detecting a movement of the device comprises detecting whether a translation of the user using the device exceeds a threshold.

13. The system of claim 11 wherein adaptively disabling or enabling a loop closure detection of the device comprises enabling the loop closure detection of the device in response to an insertion of an anchor point based upon an interaction of the user with a scene.

14. The system of claim 11 wherein adaptively disabling or enabling a loop closure detection of the device comprises disabling the loop closure detection of a head mounted device based upon at least one of a translation or rotation of the head mounted device.

15. The system of claim 11 wherein adaptively disabling or enabling a loop closure detection of the device comprises enabling a loop closure detection in response to a deletion of an anchor point.

16. A non-transitory computer-readable storage medium having data stored therein representing instructions executable by a processor to perform a method comprising:
   detecting a movement of a device having a camera;
   analyzing the detected movement of the device;
   determining whether the detected movement of the device is associated with an action of a user of the device or a motion of the user of the device; and
   adaptively disabling or enabling, using a processor of the device, a loop closure detection of the device based upon whether the detected movement of the device is the action of the user or the motion of the user.

17. The non-transitory computer-readable storage medium of claim 16 wherein detecting a movement of the device comprises detecting whether a translation of the user using the device exceeds a threshold.

18. The non-transitory computer-readable storage medium of claim 16 wherein adaptively disabling or enabling a loop closure detection of the device comprises enabling the loop closure detection of the device in response to an insertion of an anchor point based upon an interaction of the user with a scene.

19. The non-transitory computer-readable storage medium of claim 16 wherein adaptively disabling or enabling a loop closure detection of the device comprises disabling the loop closure detection of a head mounted device based upon at least one of a translation or rotation of the head mounted device.

20. The non-transitory computer-readable storage medium of claim 16 wherein adaptively disabling or enabling a loop closure detection of the device comprises enabling a loop closure detection in response to a deletion of an anchor point.

* * * * *